United States Patent

Dai et al.

[11] Patent Number: 6,137,441
[45] Date of Patent: Oct. 24, 2000

[54] ACCURATE RANGE AND RANGE RATE DETERMINATION IN A SATELLITE COMMUNICATIONS SYSTEM

[75] Inventors: Jin Dai, San Diego, Calif.; Nadav Levanon, Ramat-Gan, Israel; Bill Ames, Poway, Calif.; Ed Victor, Louisville, Colo.; Jim Determan, Encinitas, Calif.

[73] Assignee: Qualcomm Incorporated, San Diego, Calif.

[21] Appl. No.: 09/150,500

[22] Filed: Sep. 9, 1998

[51] Int. Cl.[7] .................. H04B 7/185; G01S 5/02
[52] U.S. Cl. ................. 342/357.16; 342/357.05; 342/418; 455/427
[58] Field of Search ............ 342/357.16, 357.05, 342/418; 455/427

[56] References Cited

U.S. PATENT DOCUMENTS

| | | | |
|---|---|---|---|
| 3,864,634 | 2/1975 | Dragonetti | 325/419 |
| 4,445,118 | 4/1984 | Taylor et al. | 343/357 |
| 4,819,053 | 4/1989 | Halavais | 342/357 |
| 5,126,748 | 6/1992 | Ames et al. | 342/353 |
| 5,412,388 | 5/1995 | Attwood | 342/357 |
| 5,412,389 | 5/1995 | Olds | 342/357 |
| 5,463,400 | 10/1995 | Tayloe | 342/352 |
| 5,500,648 | 3/1996 | Maine et al. | 342/357 |
| 5,548,801 | 8/1996 | Araki et al. | 455/13.1 |
| 5,552,795 | 9/1996 | Tayloe et al. | 342/357 |
| 5,561,838 | 10/1996 | Chandos et al. . | |
| 5,566,354 | 10/1996 | Sehloemer | 455/12.1 |
| 5,617,101 | 4/1997 | Maine et al. . | |
| 5,619,525 | 4/1997 | Wiedeman et al. | 375/200 |
| 5,634,190 | 5/1997 | Wiedeman | 455/13.1 |
| 5,644,572 | 7/1997 | Olds et al. | 370/324 |
| 5,666,648 | 9/1997 | Stuart | 370/321 |
| 5,732,387 | 3/1998 | Armbruster et al. . | |

FOREIGN PATENT DOCUMENTS

| | | | |
|---|---|---|---|
| 0337269 | 4/1989 | European Pat. Off. | H04B 7/26 |
| 0546758 | 12/1992 | European Pat. Off. | H04Q 7/04 |
| 0582073 | 6/1993 | European Pat. Off. | G01S 5/02 |
| 8801392 | 2/1988 | WIPO | G01S 13/78 |
| 9608882 | 3/1996 | WIPO | H04B 7/185 |
| 9621162 | 7/1996 | WIPO | G01S 5/02 |

*Primary Examiner*—Theodore M. Blum
*Attorney, Agent, or Firm*—Phillip R. Wadsworth; Gregory D. Ogrod

[57] ABSTRACT

The present invention is a system and method for accurately determining the distance (range) between one or more satellites and a user terminal and the rate of change (range rate) of that distance. When accurately determined according to the present invention, these quantities can be used to determine the location of the user terminal with a high degree of accuracy. When one satellite is available, the present invention determines the range and range rate based on the Doppler frequency shift that a signal experiences between the satellite and the user terminal, the round trip delay a signal experiences during transmission from the satellite to the user terminal and back via a satellite to a gateway, the Doppler frequency shift a signal experiences between the satellite and the gateway, and the timestamps of the measurements. When a second satellite is available, the present invention determines the range and range rate between the second satellite and the user terminal based on the round trip delay, the Doppler frequency shift that a signal experiences between the second satellite and the user terminal, and the difference in arrival times at the user terminal of the signals from the satellites.

10 Claims, 6 Drawing Sheets

ACCURATE RANGE AND RANGE RATE DETERMINATION IN A SATELLITE COMMUNICATIONS SYSTEM

BACKGROUND OF THE INVENTION

1. Field of the Invention

The present invention relates generally to satellite communication systems and networks. More particularly, the present invention relates to determining the distances between mobile stations and satellites and the rates of change of those distances.

2. Description of the Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

While the advent of the mobile user terminal has freed users to take their phones wherever they go, it has also imposed upon the satellite communications carrier the burden of determining the location of the user terminal. The need for user terminal position information stems from several considerations. One consideration is that the system should select an appropriate gateway for providing the communications link. One aspect of this consideration is allocation of a communications link to the proper service provider (for example, a telephone company). A service provider is typically assigned a particular geographic territory, and handles all calls with users in that territory. When communications are required with a particular user terminal, the communications system can allocate the call to a service provider based on the territory within which the user terminal is located. In order to determine the appropriate territory, the communications system requires the position of the user terminal. A similar consideration arises when calls must be allocated to service providers based on political boundaries or contractual services.

Several methods of determining the location of the user terminal involve measuring the distance (range) between the user terminal and the satellite and the rate of change of that distance (range rate). When these measurements are combined with other data, such as the position of the satellite, the location of the user terminal can be determined precisely. Techniques for determining user terminal location using satellite-user terminal range and range rate are disclosed in commonly-owned, copending applications entitled "Position Determination Using One Low-Earth Orbit Satellite," Ser. No. 08/723,751; and "Unambiguous Position Determination Using Two Low-Earth Orbit Satellites," Ser. No. 08/723,725.

In the above-described patent applications, the satellite-user terminal range and range rate are ascertained based on measurements of communications signals that are taken at both the user terminal and the gateway. In general, these measurements are not taken simultaneously. Therefore, the satellite moves between the user terminal measurement and the gateway measurement. What is needed is a way to account for the satellite motion in order to obtain more accurate measurements, which will in turn yield more accurate position information for the user terminal.

SUMMARY OF THE INVENTION

The present invention comprises an apparatus and method for accurately determining the distance (range) between one or more satellites and a user terminal and the rate of change (range rate) of that distance. When accurately determined according to the present invention, these quantities can be used to determine the location of the user terminal with a high degree of accuracy.

According to the method, the user terminal receives a first signal transmitted from a satellite. The user terminal measures the Doppler frequency shift of the signal and timestamps the measurement. The user terminal then transmits the Doppler shift measurement and the timestamp to the gateway as a second signal. The gateway measures the round trip delay between the transmission of the first signal by the satellite and the reception of the second signal at the gateway. The gateway also measures the Doppler frequency shift of the second signal and timestamps the measurements. The gateway then determines the range and range rate between the satellite and the user terminal based on the round trip delay, the Doppler frequency shifts, and the timestamps.

If a second satellite is available, the present invention can obtain the range and range rate between the user terminal and the second satellite by taking two additional measurements. According to this method, the user terminal receives a third signal transmitted from the second satellite. The user terminal measures the Doppler frequency shift of the third signal experienced. The user terminal also measures the arrival time difference between the first and third signals and timestamps the measurement. The user terminal then transmits these measurements to the gateway. The gateway then determines the range and range rate between the second satellite and the user terminal based on the round trip delay, the Doppler shift of the third signal, and the arrival time difference.

One advantage of the present invention is that it permits determination of the range and range rate between a satellite and a user terminal, corrected for the acceleration of the satellite, without requiring knowledge of the position of the user terminal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Introduction

The present invention is an apparatus and method for accurately determining the distance (range) between one or more satellites and a user terminal and the rate of change (range rate) of that distance. When accurately determined according to the present invention, these quantities can be used to determine the location of the user terminal with a high degree of accuracy.

The present invention is particularly suited for use in communications systems employing low Earth orbit (LEO) satellites. However, as would be apparent to one skilled in the relevant art, the concept of the present invention can also be applied to satellite systems in which the satellites travel in non-LEO orbits. Before discussing the embodiments of the present invention, a typical environment in which the invention can operate is presented.

A Typical Satellite Communications System

Figure 1:
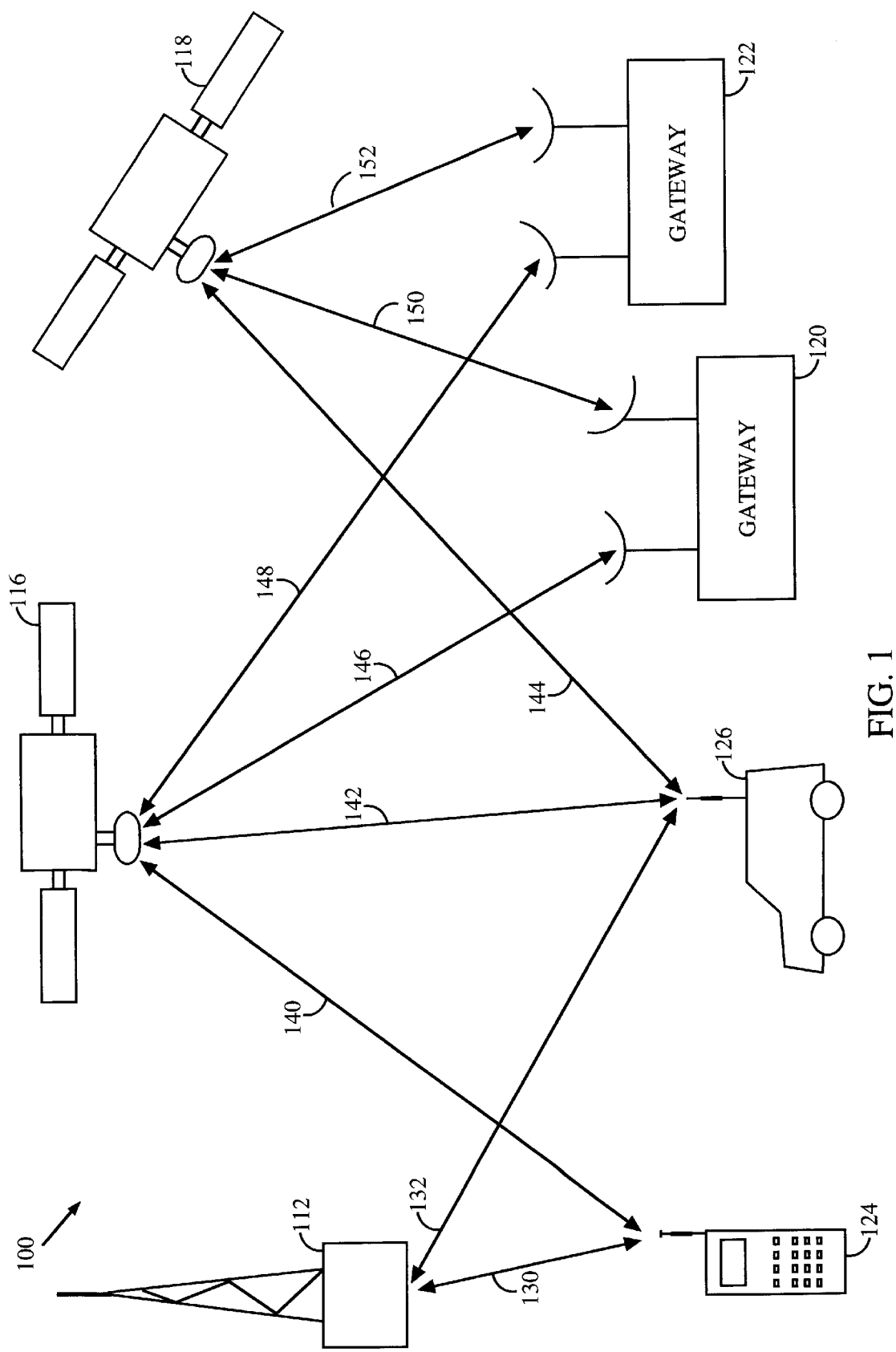
FIG. 1 illustrates an exemplary wireless communication system in which the present invention is useful.

An exemplary wireless communication system in which the present invention is useful is illustrated in FIG. 1. It is contemplated that this communication system uses code division multiple access (CDMA) type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depends on desired system capacity and other factors well understood in the art.

User terminals 124 and 126 each include a wireless communication device such as, but not limited to, a cellular telephone, a data transceiver, or a paging or position determination receiver, and can be hand-held or vehicle-mounted as desired.

Generally, beams from satellites 116 and 118 cover different geographical areas in predefined patterns. Beams at different frequencies, also referred to as CDMA channels or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or data to user terminals 124 and 126.

For ease of discussion of the signal paths described above, the following convention is adopted in this disclosure. Signals transmitted from a gateway to a satellite are referred to as the "forward uplink." Signals transmitted by a satellite to a user terminal are referred to as the "forward downlink." The forward uplink and forward downlink are referred to collectively as the "forward link." Signals transmitted from a user terminal to a satellite are referred to as the "reverse uplink." Signals transmitted by a satellite to a gateway are referred to as the "reverse downlink." The reverse uplink and reverse downlink are referred to collectively as the "reverse link."

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination. A preferred application is in CDMA wireless spread spectrum communication systems for telephone service.

Overview

The present invention is a system and method for accurately determining range and range rate between one or more satellites and a user terminal. When accurately determined according to the present invention, these quantities can be used to determine the location of the user terminal with a high degree of accuracy. Techniques for determining the location of a user terminal using satellite-user terminal range and range-rate are disclosed in the above-mentioned '751 and '725 applications, which are incorporated by reference herein in their entirety. A technique for rapidly determining the position of a user terminal using range and range rate is disclosed in a commonly-owned patent application, filed concurrently herewith, entitled "Fast User Terminal Position Determination in a Satellite Communications System," Serial No. (to be assigned, Attorney Docket Number QCPD888; SKGF 1549.0910000), which is incorporated herein by reference herein in its entirety.

The present invention employs two basic parameters to obtain accurate measurements of range and range-rate. The first is the round trip delay (RTD) of a signal transmitted from a reference satellite to a user terminal and back to a gateway In CDMA technology, system time is encoded in a communications signal as a particular phase of a pseudonoise (PN) sequence. Therefore, RTD can be determined by determining the PN phase offset between the signal transmitted from the gateway and the signal received at the gateway (referred to herein as RxDelay), then subtracting the PN phase offset between the user terminal transmitting and receiving clocks (referred to herein as PNDelay). However, this simple method becomes much more complicated when considering the movement of the satellite in the interval between the transmission of the signal by the gateway and the reception of the signal by the gateway.

The second parameter used is the Doppler shift of the reverse uplink signal. Ignoring the relativistic effect, the formula that relates frequency offset and relative movement is $$\dot{R} = -c\Delta f / f_N$$

where $\Delta f$ is the frequency offset, $f_N$ is the nominal frequency, c is the speed of light, and $\dot{R}$ is the range rate. However, the user terminal clock error, which can be as large as 10 ppm, can cause a bias in the Doppler shift measured by the user terminal and in the frequency of the transmitted user terminal carrier. This clock error is estimated by the gateway in order to obtain the true Doppler frequency shift.

According to the present invention, RTD measurements resolve to two different scenarios. In one scenario, referred to as simple RTD calculation, the forward link satellite (also referred to herein as the reference satellite) and the reverse link satellite are the same. In the other scenario, referred to as hybrid RTD calculation, the forward link satellite and the reverse link satellite are different satellites.

The above-described parameters are obtained by measuring the characteristics of communications signals exchanged between the user terminal and gateway through one or more satellites. In a preferred embodiment, the measured signals are part of traffic, paging and access signals. These signals are now described.

Pilot signals are used by user terminals to obtain initial system synchronization and time, frequency, and phase tracking of other signals transmitted by the gateway. Phase information obtained from tracking a pilot signal carrier is used as a carrier phase reference for coherent demodulation of other system signals or traffic signals. This technique allows many traffic signals to share a common pilot signal as a phase reference, providing for a less costly and more efficient tracking mechanism. Traffic signals are the bearer communications signals that carry user traffic, such as voice and data, between the user terminal and the gateway during a communications session.

When a user terminal is not involved in a communications session (that is, the user terminal is not receiving or transmitting traffic signals), the gateway can convey information to that particular user terminal using a signal known as a paging signal. For example, when a call has been placed to a particular mobile phone, the gateway alerts the mobile phone by means of a paging signal. Paging signals are also used to distribute traffic channel assignments, access channel assignments, and system overhead information.

A user terminal can respond to a paging signal by sending an access signal or access probe over the reverse link (that is, the communications link originating at the user terminal and terminating at the gateway). The access signal is also used when a user terminal originates a call. In a preferred embodiment, the access channel is a slotted random access channel. Slotted random access techniques are well-known in the relevant art.

Gateway Architecture

Figure 2:
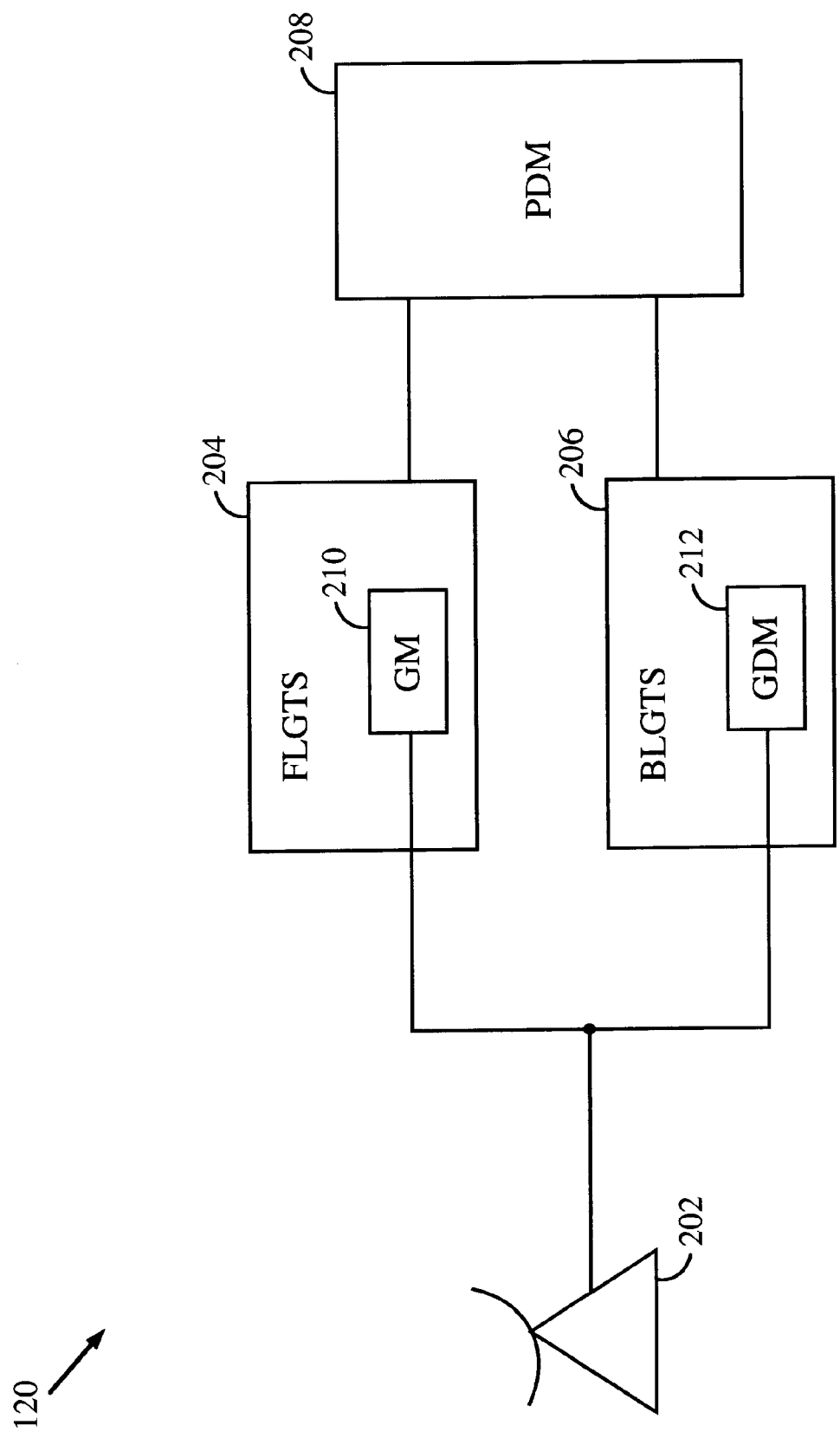
FIG. 2 is a block diagram illustrating the functional architecture of a gateway according to a preferred embodiment of the present invention.

FIG. 2 is a block diagram illustrating the functional architecture of a gateway 120 according to a preferred embodiment of the present invention. Gateway 120 includes a gateway antenna 202, a forward link gateway transceiver system (FLGTS) 204, a reverse link gateway transceiver system (RLGTS) 206, and a position determination module (PDM) 208. FLGTS 204 includes gateway modulator (GM) 210. RLGTS 206 includes gateway demodulator (GDM 212).

FLGTS 204 manages the forward link. FLGTS 204 precorrects the timing of forward link signals, including paging and traffic signals, such that the signals are aligned with system timing when they arrive at the forward link satellite. This timing correction must account for the delay between GM 210 and the gateway antenna and the propagation delay, including atmospheric effects, between the gateway antenna and the forward link satellite. FLGTS 204 also precorrects the frequency of these signals to compensate for the Doppler shift between the gateway and the forward link satellite. GM 210 modulates the forward link signal for transmission by the gateway antenna. Techniques for time and frequency precorrection are disclosed in a commonly-owned, copending application entitled "Time and Frequency Precorrection for Non-Geostationary Satellite Systems" having application number Ser. No. 08/723,490, filed Sep. 30, 1996, which is incorporated by reference herein in its entirety.

RLGTS 206 manages the reverse link. RLGTS 206 compensates the gateway measurement RxDelay for the delay the reverse link signal incurs between gateway antenna 202 and GDM 212. RLGTS 206 also compensates the gateway measurement RxFrequency (described below) for the Doppler shift the reverse downlink signal experiences between the reverse link satellite and the gateway antenna. GDM 212 demodulates the reverse link signal received by the gateway antenna.

PDM 208 performs the calculations necessary to determine the position of the user terminal based on position and velocity information for the forward and reverse link satellites and the measurements taken by the user terminal and the gateway. PDM 208 computes the propagation delays for the forward downlink and the reverse uplink. PDM 208 performs several timing corrections for the forward and reverse links. PDM 208 also computes the true Doppler shifts for the forward downlink and the reverse uplink.

User Terminal Measurements

The user terminal measures two characteristics on the reverse downlink signal: PNDelay and TxFrequency. PNDelay is the time difference between the clock phase of the forward downlink signal received at the user terminal and the clock phase of the user terminal clock. In a preferred embodiment, PNDelay is obtained by determining the PN offset between the user terminal clock and the received forward downlink.

TxFrequency is a measurement of the Doppler shift that the forward link signal experiences between the satellite and the user terminal. FLGTS 204 precorrects the frequency of the forward link signal to eliminate the Doppler shift that the forward link signal experiences between the gateway and the forward link satellite. However, because the measurement of TxFrequency is based on the user terminal clock, PDM 208 corrects TxFrequency for the user terminal clock error, as described below.

A time stamp TxTimestamp is reported to the gateway with the PNDelay and TxFrequency measurements. TxTimestamp indicates the time at which the measurements were taken by the user terminal.

Gateway Measurements

The gateway measures two characteristics on the reverse downlink signal: RxDelay and RxFrequency. RxDelay is the propagation delay experienced by a signal transmitted by a forward link satellite to the user terminal and back via a reverse link satellite to the gateway. As mentioned above, the timing of the signal is precorrected at the gateway (i.e., prior to transmission) to account for the propagation delay on the forward link between the gateway and the forward link satellite. Therefore, when the forward link signal arrives at the forward link satellite, it is aligned with system time. This effectively eliminates the forward uplink propagation delay from the measurement.

In order to determine the actual "in air" delay time, PDM 208 subtracts the delay experienced by the signal during processing at the user terminal. This delay is reported by the user terminal to the gateway as PNDelay, as described above. Because it is the forward link's arrival time at the forward link satellite that is aligned with system time, PDM 208 also subtracts the delay experienced at the forward link satellite between reception of the forward link signal from the gateway and transmission of the forward link signal to the user terminal.

RxFrequency is a measurement of the Doppler shift that the reverse link signal experiences between the user terminal and the satellite. RLGTS 206 postcorrects the frequency of the reverse link signal to eliminate the Doppler shift that the signal experiences between the reverse link satellite and the gateway. However, because the measurement of RxFrequency is based on the user terminal clock, PDM 208 corrects RxFrequency for the user terminal clock error, as described below.

A time stamp RxTimestamp is stored with the RxDelay and RxFrequency measurements. RxTimestamp indicates the time at which the RxDelay and RxFrequency measurements are taken. Because the reverse downlink signal is not measured until it reaches GDM 212, RLGTS 206 subtracts the delay the signal experiences between gateway antenna 202 and GDM 212 from RxDelay and RxTimestamp. PDM 208 then uses the position of gateway antenna 202 to compute the user terminal position. Determination of Range Rate and User Terminal Clock Error As mentioned above, the determination of range rate is affected by any error in the user terminal clock. The user terminal's clock error is calculated from the user terminal's measurement of Doppler shift on the forward downlink (TxFrequency) and the gateway's measurement of Doppler shift on the reverse uplink (RxFrequency). If the user terminal clock, driven by its internal oscillator, had no error, these two measurements would predict the same range rate. However, if the user terminal clock has an error, then the nominal transmit frequency of the user terminal, and the frequency measurements made by the user terminal, will also have errors. For example, if the oscillator's frequency has a positive error, the user terminal will transmit at a higher than nominal frequency but measure a lower received frequency. The user terminal clock error $\epsilon$ and the range rate $\dot{R}$ are related by the following formulas:

$$\dot{R} = -\frac{c}{2}(\Delta_F f / f_{NF} + \Delta_R f / f_{NR}) \quad (1)$$

$$\varepsilon = \frac{1}{2}(\Delta_R f / f_{NR} - \Delta_F f / f_{NF}) \quad (2)$$

where $\epsilon$ is the normalized clock error represented as a ratio of the user terminal clock rate error to the nominal user terminal clock rate, c is the speed of light, and $f_{NF}$ and $f_{NR}$ are the forward and reverse link nominal frequencies, respectively. $\Delta_R f$ is the Doppler offset measured by RLGTS 206 (also referred to as RxFrequency). $\Delta_F f$ is the Doppler offset measured by the user terminal (also referred to as TxFrequency). Note that due to the frequency precorrection performed by FLGTS 204, the forward link signal frequency is at nominal when leaving the forward link satellite, so TxFrequency does not include the forward uplink Doppler shift.

If the user terminal sees more than one satellite, a second satellite's range rate can easily be calculated once we know $\epsilon$:

$$\dot{R}_{sat2} = -c(\Delta_F f_{sat2}/f_{NF} + \epsilon) \quad (3)$$

where $\Delta_F f_{sat2}$ is the Doppler offset measured by the user terminal for the forward downlink from the second satellite.

Timing Relationships

Figure 3:
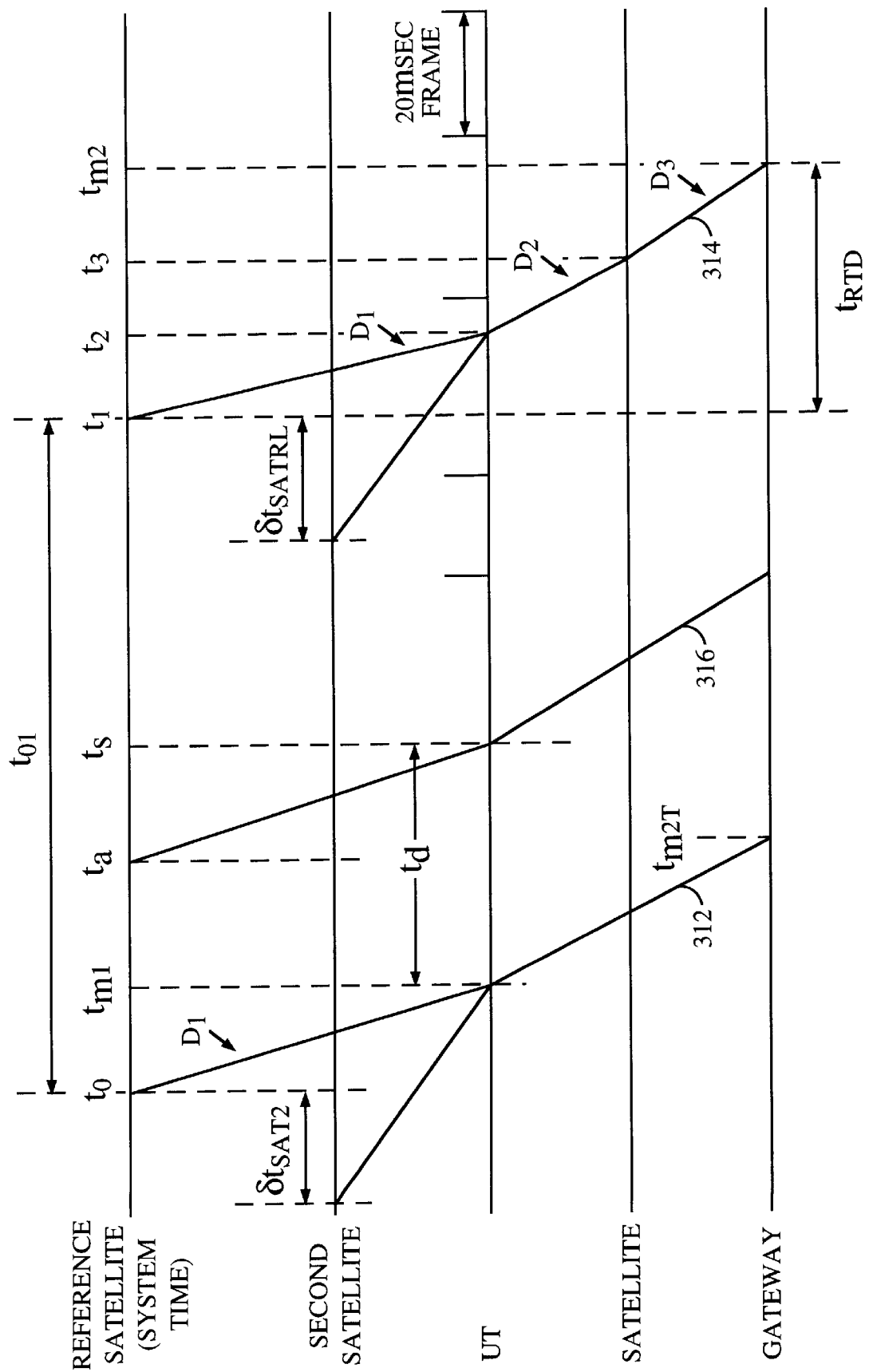
FIG. 3 is a timing diagram representing the relative timing of the measurements taken at the user terminal and gateway.

In order to account for range acceleration resulting from satellite motion, it is necessary to understand the timing relationships between events occurring at the user terminal, the gateway, and the satellites. FIG. 3 is a timing diagram representing the relative timing of the measurements taken at the user terminal and gateway. FIG. 3 presents four time axes. System time axis 302 represents the system timing for the communications system. As described above, the gateway precorrects the timing of forward link signals for the propagation delay between the gateway and the forward link satellite. Therefore, system time axis 302 also represents time at the forward link relay satellite.

User terminal time axis 304 represents the timing of events occurring at the user terminal. Satellite time axis 306 represents events occurring at the reverse link relay satellite. Gateway time axis 308 represents events occurring at the gateway. In some scenarios, the user terminal takes measurements of signals from satellites other than the reference satellite. Therefore, FIG. 3 includes an additional time axis 310 to represent events occurring at a second satellite.

FIG. 3 also includes three timelines. Timeline 312 connects points on time axes 302–308 that relate to the measurements made at the user terminal. The user terminal measurements are made at time $t_{m1}$. However, the user terminal uses the system timing of the measured signal to time-stamp the measurement. Therefore, the time stamp applied by the user terminal to the measurements is $t_0$. The difference between $t_{m1}$ and $t_0$ is the propagation delay D1 between the forward link satellite and the user terminal.

Some time later, at $t_s$, the user terminal transmits a positioning message which contains the measurements. Timeline 316 connects points on time axes 302–308 that correspond to $t_s$. When the user terminal transmits the positioning message over the access channel, the transmission is initiated at the beginning of an access channel slot, as indicated by $t_a$ at the intersection of time axis 302 and timeline 316. The delay $t_d$ between $t_s$ and $t_{m1}$ can be quite long, up to 200 ms on the access channel and up to 1 second on the traffic channel.

The gateway measurements, represented by timeline 314, are performed at an arbitrary time $t_{m2}$. The times $t_3$, $t_2$, and $t_1$ represent the measurement point propagated back to the reverse link satellite, user terminal, and the forward link satellite, respectively. $D_3$ represents the propagation delay between the gateway and the reverse link satellite. $D_2$ represents the propagation delay between the reverse link satellite and the user terminal. $D_1'$ represents the propagation delay between the user terminal and the forward link satellite. In a preferred embodiment, each satellite-ground leg of the propagation delay (e.g. $D_1$, $D_1'$, $D_2$ and $D_3$) ranges between 4.7 ms and 13.2 ms in length.

Correction Due to Range Acceleration

The forward link and reverse link Doppler measurements are performed at different times. In a preferred embodiment, the interval between the measurements can be up to 400 ms on an access channel. Satellite motion during this interval, and the resulting range acceleration, causes bias to the range rate. According to the present invention, additional correction terms are added to correct for this range acceleration. Referring to FIG. 3, the two measurements are separated by:

$$t_3 - t_0 = t_{MD} - D_3 \quad (4)$$

where $t_{MD}$ is the time duration between the user terminal measurements and the gateway measurements, $t_{MD}$ is given by:

$$t_{MD} = t_{m2} - t_0 = \text{RxTimestamp} - \text{TxTimestamp} \quad (5)$$

Letting $\dot{R}_0$ and $\epsilon_0$ represent the leading order (i.e., uncorrected) result obtained in equations (1) and (2), yields:

$$\dot{R} = \dot{R}_0 - \frac{1}{2}\ddot{R}(t_{MD} - D_3) \quad (6)$$

$$\varepsilon = \varepsilon_0 + \frac{1}{2}\dot{R}(t_{MD} - D_3) \quad (7)$$

Figure 4:
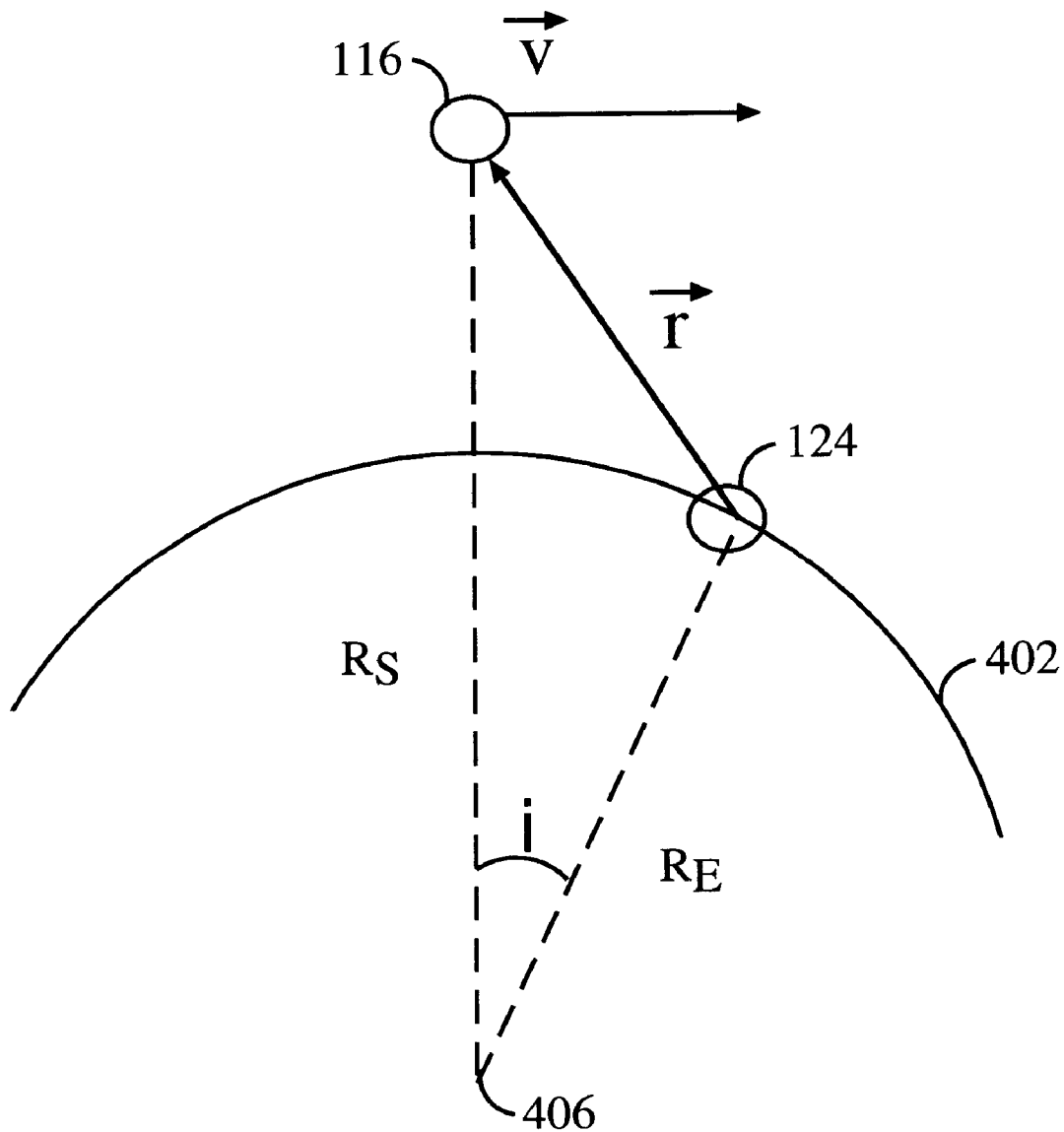
FIG. 4 is a representation of the spatial relationships between the Earth, a user terminal, and a satellite.

FIG. 4 is a representation of the spatial relationships between the Earth 402, user terminal 124, and satellite 116. The vector $\vec{v}$ represents the satellite velocity and $\vec{r}$ represents the vector pointing from the user terminal to the satellite. The range $R = \|\vec{r}\|$. The range rate is given by:

$$\dot{R} = \frac{\vec{v} \cdot \vec{r}}{R} \quad (8)$$

Taking the derivative of both sides of this equation, and using $\vec{v} = \dot{\vec{r}}$ yields an expression for the range acceleration:

$$\ddot{R} = \frac{\dot{\vec{v}} \cdot \vec{r}}{R} + \frac{\vec{v}^2}{R} - \frac{\dot{R}^2}{R} \quad (9)$$

A good approximation for the first term is obtained by assuming that the Earth is a sphere with radius $R_E$. Let $R_S$ be the distance between the satellite and the center 406 of the Earth 402, which is obtained using satellite position and velocity information and the time stamp. Then from Newton's gravitation law (ignoring the Earth rotation effect), $\dot{\vec{v}}$ is a vector that points to the center of the Earth, and its magnitude $\alpha$ is:

$$a = \frac{GM_E}{R_S^2} \quad (10)$$

where G is Newton's gravitational constant and $M_E$ is the Earth's total mass. From FIG. 3, we have:

$$\frac{\dot{\vec{v}} \cdot \vec{r}}{R} = -a\cos\theta = -a\frac{R^2 + R_S^2 - R_E^2}{2RR_S} \quad (11)$$

By substituting for $\dot{\vec{v}} \cdot \vec{r}$ and $\vec{v}^2$ in the expression for $\ddot{R}$, we obtain an expression that depends only on $R$, $\dot{R}$, which we replace with $R_0$ and $\dot{R}_0$, and known constants:

$$\ddot{R} = \frac{\vec{v}^2 - \dot{R}_0^2}{R_0} - \mu\frac{R_S^2 + R_0^2 - R_E^2}{2R_0 R_S^3} \quad (12)$$

where $\mu = GM_E$. Note that approximate range rate $\dot{R}_0$ and approximate range $R_0$ are needed as input. We have already calculated $\dot{R}_0$ and $R_0$ can be obtained using equation (28) or (32), described below. The higher order correction terms can be ignored.

Single Satellite Case

In one scenario, the forward link satellite and the reverse link satellite are the same. The user terminal-satellite range is a function of time. The range of interest is $R_1 = cD_1$, which is the distance between the satellite and the user terminal at time $t_0$. The formula for $R_1$ is given below in equation (28). In a preferred embodiment, the quantities $\dot{R}/c$, $\epsilon$, and $v/c$ are treated as very small quantities and second order effects in these quantities are discarded. Letting $t_{RTD}$ represent the round trip delay RTD, $$t_{RTD} = D_1' + D_2 + D_3 + t_{sat} + t_{atmos} \quad (13)$$

where $t_{sat}$ is the total (forward link+reverse link) satellite transponder delay and $t_{atmos}$ is the total atmospheric correction. Given the satellite orbit and gateway location, $D_3$ can be computed, but according to the present invention, satellite movement is also considered. Using the vectors $\vec{r}$ and $\vec{v}$ to represent the satellite's position and velocity at time $t_{m2}$ and $\vec{r}_0$ to represent the position of gateway antenna 202, to the first order, we have:

$$D_3 \approx \frac{1}{c}\left[\|\vec{r} - \vec{r}_0\| - \frac{\vec{v}}{c} \cdot (\vec{r} - \vec{r}_0)\right] \quad (14)$$

For the access channel, neglecting satellite motion we have $t_{RTD}$=RxDelay−PNDelay. But PNDelay is determined at some earlier time $t_s$ of the desired time $t_2$. Thus a satellite motion away from the user terminal will reduce the PN offset at the user terminal, as will a negative user terminal clock error. Therefore we have:

$$t_{RTD} = RxDelay - PNDelay + (\dot{R}/c + \varepsilon)(t_2 - t_s) \quad (15)$$

$$\approx RxDelay - PNDelay + (\dot{R}/c + \varepsilon)(t_1 - t_a - PNDelay)$$

$$\approx RxDelay - PNDelay + (\dot{R}/c + \varepsilon)(t_{m2} - t_a - t_{RTD0} - PNDelay)$$

$$= t_{RTD0}(1 - \dot{R}/c - \varepsilon) +$$

$$(\dot{R}/c + \varepsilon)(Rx\_Timestamp - t_a - PNDelay)$$

where the access channel slot boundary $t_a$ is found using the access channel slot length, and $$t_{RTD0} = RxDelay - PNDelay \quad (16)$$

RxDelay is measured by RLGTS 206. PNDelay and TxDelay are reported by the user terminal. Equations for $\dot{R}$ and $\epsilon$ were given above. $\dot{R}$ is treated as being constant throughout the process. The change of $\dot{R}$ is very slow and its effect is negligible.

Finally, we also have:

$$D_2 - D_1' = \dot{R}(t_3 - t_1)/c = \dot{R}(D_1' + D_2)/c \quad (17)$$

Combining these equations and using FIG. 3 yields:

$$R_1' = cD_1' = \frac{c}{2}(t_{RTD} - D_3 - t_{sat} - t_{atmos})(1 - \dot{R}/c) \quad (18)$$

$$R_1 = R_1' - \dot{R}(t_1 - t_0) \approx R_1' - \dot{R}(t_{MD} - t_{RTD0}) \quad (19)$$

where $R_1'$ is the distance between the satellite and the user terminal at time $t_1$.

In this simple case, the user terminal may also receive signals from other satellites. By calculating the range and range rate between the user terminal and these other satellites, the present invention can provide more information for position determination. For example, this information can be used to improve the accuracy of a position determination or to resolve an ambiguity in a position solution.

When the user terminal receives signals from other satellites, it measures their relative arrival times with respect to the reference satellite and reports the measurements to the gateway. Let $\delta t_{sat2}$ represent the difference in arrival times between the signals from the reference satellite and the signals from a second satellite, as shown in FIG. 3. The sign convention for $\delta t_{sat2}$ is that a later arrival at the user terminal corresponds to a positive $\delta t_{sat2}$. Because this arrival time difference is measured by taking a PN offset measurement, it is not influenced by user terminal clock error.

Let $R_{1ref}$ and $R_{1sat2}$ represent the ranges of the reference satellite and the second satellite, respectively, at time $t_0$. From FIG. 3, it is clear that $\delta t_{sat2}$ represents the range difference between the second satellite and the reference satellite at the time $t_0 - \delta t_{sat2}$. According to the present invention, a correction is made to account for satellite motion to obtain $R_{1sat2}$. Therefore, to the first order, we have:

$$R_{1sat2} = R_{1ref} + c\delta t_{sat2} + \dot{R}_{sat2}\delta t_{sat2} \qquad (20)$$

where $\dot{R}_{sat2}$ is given by equation (3).

Multiple Satellite Case

In another scenario, the reference satellite and the reverse link satellite are not the same. In this scenario, the user terminal measurement is taken on a signal transmitted by the reference satellite, and the gateway measurement is taken on a signal transmitted by the reverse link satellite. This situation is referred to as a "hybrid" RTD calculation. PDM 208 detects a hybrid RTD calculation by comparing the satellite ID reported by the user terminal and the satellite ID reported by RLGTS 206. If they are not the same, the RTD calculation is a hybrid.

For a hybrid RTD calculation, it is assumed that the reverse link satellite is also observed by the user terminal on the forward link. The arrival time difference $\delta t_{sat2}$ is measured and reported to the gateway as described above. First, the arrival time difference at time $t_2$ is calculated:

$$\delta t'_{satRL} \approx \delta t_{satRL} + (\dot{R}_{satRL} - \dot{R}_{ref})(t_1 - t_0) \approx \delta t_{satRL} + (\dot{R}_{satRL} - \dot{R}_{ref})(t_{MD} - t_{RTD0}) \qquad (21)$$

where $t_{MD}$ and $t_{RTD0}$ have been defined above. Then the formula for $R_{1satRL}$ is found by replacing the reference satellite with the reverse link satellite and replacing $t_{RTD0}$ with $t_{RTD0} + \delta t_{satRL}$ in equation (19).

$$t_{RTDsatRL} = t_{RTD0} + \delta t_{satRL} + (\dot{R}_{satRL} - \dot{R}_{ref})(t_{MD} - t_{RTD0}) + (\dot{R}_{ref}/c + \epsilon)(\text{RxTimestamp} - t_a - \text{PNDelay}) \qquad (22)$$

$$R'_{1satRL} = \frac{c}{2}(t_{RTDsatRL} - D_3 - t_{sat} - t_{atmos})(1 - \dot{R}_{satRL}/c) \qquad (23)$$

Note that the satellite transponder delay includes forward link and reverse link delay on two different satellites. Since $t_0 = \text{TxTimestamp}$ is the time at which all ranges are defined, $$R_{1satRL} \approx R_{1satRL}' - \dot{R}_{satRL}(t_{MD} - t_{RTD0}) \qquad (24)$$

Traffic Channel RTD

Determination of RTD on a traffic channel is more involved. Because RLGTS 206 cannot anticipate the arrival of positioning data, it performs a group of measurements, called a "finger dump," for each 20 ms frame. The finger dumps are stored in a buffer of at least 100 frames. When RLGTS 206 receives a positioning message from a user terminal, it retrieves one or more finger dumps from the buffer and generates an appropriate set of user terminal measurements, called a finger dump result.

RLGTS 206 then determines the appropriate measurement time for the finger dump result to be used. In general RLGTS 206 will not have a finger dump at precisely the desired measurement time. In a preferred embodiment, RLGTS 206 takes two consecutive finger dumps, one taken before the desired measurement time and one taken after the desired measurement time, and performs a two-point linear interpolation to obtain the appropriate values for RxDelay and RxFrequency. This technique is disclosed in more detail in the application entitled "System and Method for Correlating Traffic Channel Signal Measurements in a Satellite Communications System," Serial No. (to be assigned, Attorney Docket Number PD888). To assist in computing the desired measurement time, $t_{m2}$, the gateway generates a quantity called AdjustedPosTime=TxTimestamp−TxDelay. RLGTS 206 determines the measurement time $t_{m2}$ as follows:

$$t_{m2} = \text{AdjustedPosTime} + \text{RxDelay} = t_0 + t_{RTD0} \qquad (25)$$

Referring to FIG. 3, this corresponds to choosing the measurement time $t_{m2} = t_{M2T}$. Therefore, the RIGTS 206 measurements correspond to the same point in the traffic sequence as the user terminal measurements. When the measurement time is chosen in this manner, RTD calculation is simplified, yielding:

$$t_{RTD0} = \text{RxDelay} - \text{PNDelay} \qquad (26)$$

Based on the equations for the access channel, we get:

$$t_{RTD} = t_{RTD0} \qquad (27)$$

$$R_1 = R'_1 = \frac{c}{2}(t_{RTD0} - t_{sat} - t_{atmos} - D_3)(1 - \dot{R}/c) \qquad (28)$$

(Simple RTD)

$$t_{RTDsatRL} = t_{RTD0} + dt_{satRL} \qquad (29)$$

$$R_{1satRL} = R'_{1satRL} \qquad (30)$$

$$= \frac{c}{2}(t_{RTDsatRL} - D_3 - t_{sat} - t_{atmos})(1 - \dot{R}_{satRL}/c)$$

(HybridRTD)

The present invention employs the timing relationships and analysis described above to determine range and range rate parameters according to the method described below. Of course, other timing relationships can be employed without departing from the scope of the present invention.

Range and Range-Rate Determination

Figure 5:
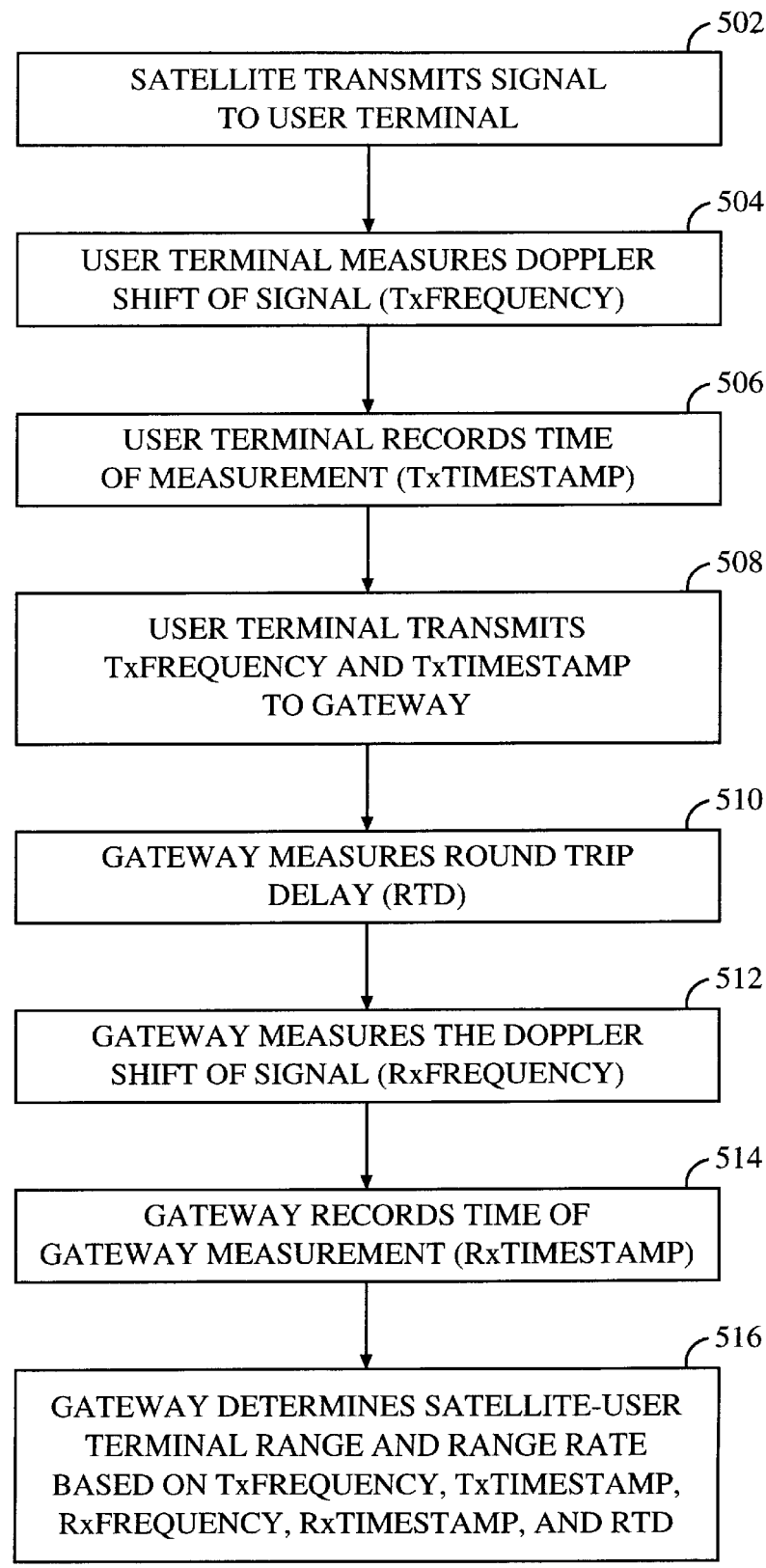
FIG. 5 is a flowchart depicting a method for determining the range and range-rate between a user terminal and a satellite according to a preferred embodiment of the present invention.

FIG. 5 is a flowchart depicting a method for determining the range and range-rate between a user terminal and a satellite when only one satellite is available, according to a preferred embodiment of the present invention. In step 502, the reference satellite transmits a signal to the user terminal. In a preferred embodiment, this signal originates at a gateway and is relayed by the reference satellite to the user terminal. In this embodiment, the gateway precorrects the timing and frequency of the signal as described above.

The user terminal receives the signal transmitted by the reference satellite. The user terminal measures the Doppler shift of the received signal and records this measurement as TxFrequency, as shown in step 504. The user terminal also records the time of this measurement as TxTimestamp, as shown in step 506. In a preferred embodiment, TxFrequency and TxTimestamp are determined by a demodulator within the user terminal. The user terminal then transmits these measurements to a gateway, as shown in step 508.

The gateway receives the signal containing the TxFrequency and TxTimestamp measurements. The gateway measures the delay between the transmission of the signal from the reference satellite in step 502 and the reception of the signal containing the TxFrequency and TxTimestamp measurements at the gateway, as shown in step 510. The gateway records this measurement as round trip delay (RTD).

The gateway also measures the Doppler shift of the received signal, and records this measurement as RxFrequency, as shown in step 512. The gateway records the time of the RTD and RxFrequency measurements as RxTimestamp, as shown in step 514. In a preferred embodiment, the RxFrequency, RxTimestamp, and RTD measurements are determined by GDM 212. Finally, the gateway determines the satellite-user terminal range and range rate based on the TxFrequency, TxTimestamp, RxFrequency, RxTimestamp and RTD measurements, as shown in step 516. In a preferred embodiment, this step is performed by PDM 208 according to the method described above.

Figure 6:
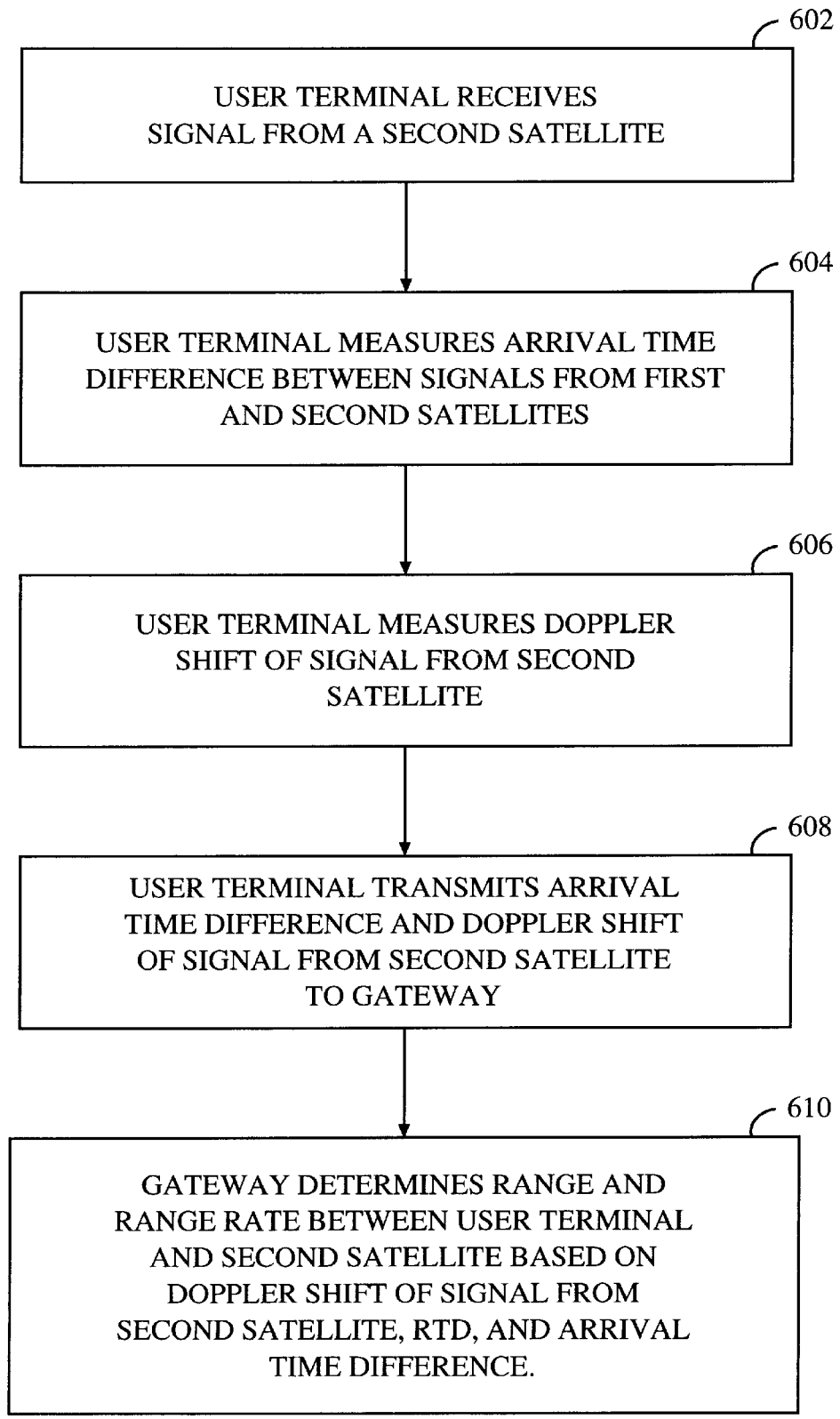
FIG. 6 is a flowchart depicting a method for determining the range and range-rate between a user terminal and a second satellite when two satellites are available, according to a preferred embodiment of the present invention.

If a second satellite is available, the present invention can also determine the range and range rate with respect to the second satellite. FIG. 6 is a flowchart depicting a method for determining the range and range-rate between a user terminal and a second satellite when two satellites are available, according to a preferred embodiment of the present invention. In step 602, the user terminal receives a signal from a second satellite. The user terminal measures the arrival time difference between the arrival of the signal from the first satellite and the arrival of the signal from the second satellite, as shown in step 604. In a preferred embodiment, the arrival time difference is determined by the user terminal demodulator. The user terminal also measures the Doppler shift of the signal received from the second satellite, as shown in step 606.

The user terminal then transmits the arrival time difference and the measured Doppler shift to the gateway. The gateway determines the range and range rate between the user terminal and the second satellite based on the measured Doppler shift of the signal from the second satellite, RTD, and the arrival time difference. In a preferred embodiment, RTD was determined with respect to the first satellite according to step 510 in FIG. 5.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. An apparatus for determining the distance between a satellite and a user terminal and the rate of change of said distance, comprising:
    a user terminal receiver to receive at a user terminal a first signal from a satellite;
    a user terminal demodulator to measure at said user terminal the frequency shift of said first signal to obtain a first Doppler shift, and to record the time of the frequency measurement to obtain a first timestamp;
    a user terminal transmitter to transmit said first Doppler shift and said first timestamp to a gateway as a second signal;
    a gateway demodulator to measure at said gateway a round trip delay between the transmission of said first signal from said satellite and the reception of said second signal at said gateway, to measure at said gateway the frequency shift of said second signal to obtain a second Doppler shift, and to record the time of the gateway measurements to obtain a second timestamp; and
    a position determination module at said gateway to determine the distance between said satellite and said user terminal and the rate of change of said distance based on said round trip delay, said first and second Doppler frequency shifts, and said first and second timestamps.

2. An apparatus according to claim 1, further comprising:
    means for receiving at said user terminal a third signal from a second satellite;
    means for measuring at the user terminal the arrival time difference between said first and third signals;
    means for measuring at the user terminal the frequency shift of said third signal to obtain a third Doppler shift;
    means for transmitting said arrival time difference and said third Doppler shift to said gateway as part of said second signal; and
    means for determining at the gateway the distance between said second satellite and the user terminal and the rate of change of said distance based on said round trip delay, said third Doppler shift, and said arrival time difference.

3. An apparatus according to claim 1, further comprising:
    means for measuring at said user terminal the interval between reception of said first signal and transmission of said second signal to obtain a user terminal delay;
    means for transmitting said user terminal delay to said gateway; and
    means for subtracting at said gateway said user terminal delay from said round trip delay.

4. An apparatus according to claim 1, further comprising:
    means for subtracting at said gateway the delay experienced by said second signal at said satellite from said round trip delay.

5. An apparatus according to claim 1, further comprising:
    means for correcting said second Doppler shift for the Doppler shift caused by the relative motion of said satellite and said gateway.

6. A method for determining the distance between a satellite and a user terminal and the rate of change of said distance, comprising:
    receiving at a user terminal a first signal from a satellite;
    measuring at said user terminal the frequency shift of said first signal to obtain a first Doppler shift;
    recording the time of the user terminal measurement to obtain a first timestamp;
    transmitting said first Doppler shift and said first timestamp to a gateway as a second signal;
    measuring at said gateway a round trip delay between the transmission of said first signal from said satellite and the reception of said second signal at said gateway;
    measuring at said gateway the frequency shift of said second signal to obtain a second Doppler shift;
    recording the time of the gateway measurement to obtain a second timestamp; and
    determining at said gateway the distance between said satellite and said user terminal and the rate of change of said distance based on said round trip delay, said first and second Doppler frequency shifts, and said first and second timestamps.

7. A method according to claim 6, comprising the further steps of:

receiving at said user terminal a third signal from a second satellite;

measuring at said user terminal the arrival time difference between said first and third signals;

measuring at said user terminal the frequency shift of said third signal to obtain a third Doppler shift;

transmitting said arrival time difference and said third Doppler shift to said gateway as part of said second signal; and determining at said gateway the distance between said second satellite and said user terminal and the rate of change of said distance based on said round trip delay, said third Doppler shift, and said arrival time difference.

8. A method according to claim 6, further comprising the steps of:

measuring at said user terminal the interval between reception of said first signal and transmission of said second signal to obtain a user terminal delay;

transmitting said user terminal delay to said gateway; and subtracting at said gateway said user terminal delay from said round trip delay prior to said determining step.

9. A method according to claim 6, further comprising the step of:

subtracting at said gateway the delay experienced by said second signal at the satellite from said round trip delay prior to said determining step.

10. A method according to claim 6, further comprising the steps of:

correcting said second Doppler shift for the Doppler shift caused by the relative motion of said satellite and said gateway prior to said determining step.

* * * * *